(12) United States Patent
McWilliam et al.

(10) Patent No.: US 10,866,098 B2
(45) Date of Patent: Dec. 15, 2020

(54) ANGULAR RATE SENSOR ARRANGED TO DETERMINE AMPLITUDE OF MOTION OF SECONDARY MODE OF VIBRATION AT RESONANT FREQUENCY

(71) Applicant: Atlantic Inertial Systems Limited, Plymouth (GB)

(72) Inventors: Stewart McWilliam, Nottingham (GB); Atanas Popov, Nottingham (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 79 days.

(21) Appl. No.: 16/160,215

(22) Filed: Oct. 15, 2018

(65) Prior Publication Data

US 2019/0285415 A1    Sep. 19, 2019

(30) Foreign Application Priority Data

Oct. 13, 2017 (GB) .................................. 1716857.6

(51) Int. Cl.
*G01C 19/5677* (2012.01)
*G01C 19/5684* (2012.01)

(52) U.S. Cl.
CPC ..... *G01C 19/5677* (2013.01); *G01C 19/5684* (2013.01)

(58) Field of Classification Search
CPC ............ G01C 19/5776; G01C 19/5726; G01C 19/5755; G01C 25/00; G01C 19/56; G01C 19/5691; G01C 19/5684
See application file for complete search history.

(56) References Cited

U.S. PATENT DOCUMENTS

| 5,739,410 A | 4/1998 | Fell |
| 6,343,509 B1 | 2/2002 | Fell et al. |

(Continued)

FOREIGN PATENT DOCUMENTS

| EP | 1062480 B1 | 12/2000 |
| EP | 1775551 A1 | 4/2007 |

(Continued)

OTHER PUBLICATIONS

Intellectual Property Office Search Report for International Application No. GB1716857.6 dated Feb. 20, 2018, 3 pages.

(Continued)

*Primary Examiner* — Brandi N Hopkins
(74) *Attorney, Agent, or Firm* — Cantor Colburn LLP

(57) ABSTRACT

A vibrating structure angular rate sensor comprises a substrate; a plurality of supporting structures fixed to the substrate; an annular member flexibly supported by the plurality of supporting structures 204; a drive system arranged to apply a periodic driving force such that the annular member 202 oscillates, in use, in a primary mode of vibration at a resonant frequency $f_1$, with an amplitude of motion that generates a restoring force from the plurality of supporting structures 204; and a pick-off system arranged to determine the amplitude of motion of a secondary mode of vibration at a resonant frequency $f_2$, in which oscillation of the annular member 202 is induced by the Coriolis force resulting from an angular rate experienced by the sensor 100. In use, the restoring force has a non-linear relationship with the amplitude of motion and a number p of supporting structures is selected such that $f_1=f_2$.

14 Claims, 8 Drawing Sheets

(56) References Cited

U.S. PATENT DOCUMENTS

| | | |
|---|---|---|
| 6,471,883 B1 | 10/2002 | Fell |
| 2004/0118204 A1 | 6/2004 | Fell et al. |
| 2004/0134278 A1* | 7/2004 | Fell .................... G01C 19/5677 |
| | | 73/504.04 |
| 2004/0134279 A1 | 7/2004 | Fell et al. |
| 2011/0023601 A1* | 2/2011 | Ikeda ................. G01C 19/5684 |
| | | 73/504.13 |
| 2012/0125100 A1* | 5/2012 | Araki ................. G01C 19/5684 |
| | | 73/504.12 |
| 2018/0259359 A1* | 9/2018 | Mansfield .......... G01C 19/5776 |

FOREIGN PATENT DOCUMENTS

| | | |
|---|---|---|
| GB | 2322196 A | 8/1998 |
| GB | 2460935 A | 12/2009 |
| RU | 2293338 C1 | 2/2007 |
| WO | 2013136049 A1 | 9/2013 |

OTHER PUBLICATIONS

European Search Report for Application No. 18275161.0-1003, dated Feb. 14, 2019, 10 pages.

* cited by examiner

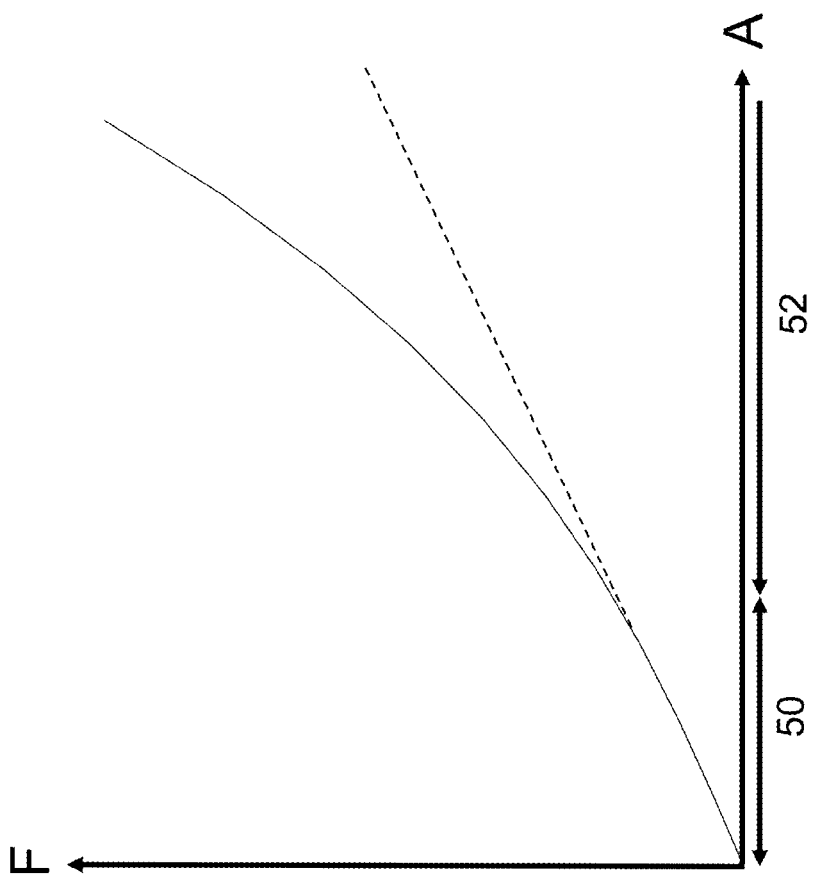

ANGULAR RATE SENSOR ARRANGED TO DETERMINE AMPLITUDE OF MOTION OF SECONDARY MODE OF VIBRATION AT RESONANT FREQUENCY

FOREIGN PRIORITY

This application claims priority to Great Britain Patent Application No. 1716857.6 filed Oct. 13, 2017, the entire contents of which is incorporated herein by reference.

TECHNICAL FIELD

The present disclosure relates to vibrating structure gyroscopes and angular rate sensors, in particular Coriolis-type angular rate sensors comprising a vibrating structure such as an annular resonator, and to methods of making and designing such angular rate sensors.

BACKGROUND

For many modern applications, vibrating structure angular rate sensors (also known as gyroscopes) are constructed using Micro-Electro-Mechanical Systems (MEMS) techniques from a silicon wafer sandwiched between glass substrate layers. A planar annular resonator, typically comprising a ring structure, is formed in the silicon layer and supported on the lower glass substrate by compliant supporting structures. The annular resonator is driven into a primary mode of vibration at resonance by primary drive transducers that excite the primary vibration mode. When the sensor undergoes rotation about an axis perpendicular to the plane of the annular resonator, Coriolis forces are generated which couple energy into a secondary vibration mode, causing oscillation in this mode. Such Coriolis-induced motion of the annular resonator can be measured and is used to calculate the rate of angular motion experienced by the rate sensor. The ring and its supporting structures are in the same plane, manufactured by etching of the silicon layer. By exploiting two degenerate resonance modes with identical frequencies, the annular resonator has higher rotation sensitivity compared to moving mass architectures that use a single resonance mode for a vibrator that can be displaced out of plane. U.S. Pat. No. 6,471,883 provides an example of such an angular rate sensor comprising a planar ring vibrating structure manufactured from silicon.

In a vibrating structure angular rate sensor, the compliant or flexible supporting structures (often known as "legs") are designed to isolate the ring's vibration from the rest of the structure. Typically eight legs are used to elastically support the annular resonator in a Coriolis-type sensor driven to oscillate in-plane in the cos 2θ mode. For inductive gyroscopes, the primary and secondary modes of vibration are usually balanced in frequency prior to use e.g. using laser balancing as disclosed in WO2013/136049, to compensate for geometrical imperfections in the ring. For capacitive gyroscopes, electrostatic balancing of the modes may be achieved dynamically, for example as disclosed in EP 1775551.

The amplitude of the induced secondary vibration mode oscillation is typically small in comparison to that of the primary vibration mode, especially at low angular rates, and as a result the measured angular rate, determined from the secondary oscillation amplitude, can have a large uncertainty for a given measurement precision. Because of this, it is beneficial to increase the amplitude of the (driven) primary mode oscillations in order to induce larger amplitude secondary mode oscillations.

The physical properties of vibrating structure angular rate sensors cause the resonant frequency of oscillation in both the primary and secondary modes to change as the amplitude of oscillation increases. At small amplitudes the resonant frequencies are generally constant, but as the amplitude increases the frequencies change non-linearly, and the resonant frequencies of the two modes split. Even after balancing of the primary and secondary modes of vibration, as described above, there usually remains a residual imbalance of ~1 Hz for a gyroscope operating at a typical resonant frequency of 14 kHz. The Applicant has recognised that this imbalance is due to the effects of non-linearity. The configuration of the support legs impacts the geometric non-linearity of the sensor. With eight legs the frequencies split predominantly due to the cubic geometrical non-linear behaviour of the legs for both radial and tangential motion during vibration. Since the resonant frequencies of the two modes are no longer identical in this non-linear regime, noise on the measurements increases and the sensitivity of the sensor decreases. Consequently, in typical vibrating structure angular rate sensors seen in the prior art, the annular resonator is always driven to oscillate in the linear regime to ensure the resonant frequencies of the primary and secondary modes do not split and impact measurements.

While limiting the amplitude of oscillation to the linear regime reduces the measurement noise it also limits the amplitude of the induced secondary mode oscillations and consequently limits the sensitivity of a sensor. As such there remains a need for a vibrating structure angular rate sensor with high accuracy that eliminates or reduces frequency splitting.

SUMMARY

The present disclosure provides a vibrating structure angular rate sensor comprising: a substrate, a plurality of supporting structures fixed to the substrate and an annular member flexibly supported by the plurality of supporting structures to move elastically relative to the substrate; a drive system arranged to apply a periodic driving force to the annular member such that the annular member oscillates, in use, in a primary mode of vibration at a resonant frequency $f_1$ with an amplitude of motion that generates a restoring force from the plurality of supporting structures; and a pick-off system arranged to determine the amplitude of motion of a secondary mode of vibration at a resonant frequency $f_2$, in which oscillation of the annular member is induced by the Coriolis force resulting from an angular rate experienced by the angular rate sensor; wherein, in use, the restoring force has a non-linear relationship with the amplitude of motion and a number p of supporting structures in the plurality of supporting structures is selected such that $f_1=f_2$.

Thus it will be seen by those skilled in the art that, in accordance with this disclosure, by driving an annular resonator at large amplitudes, wherein the restoring force has a non-linear relationship with the amplitude of motion, the secondary mode oscillations induced are greater in amplitude and therefore the uncertainty on measurements of the secondary mode oscillation amplitude may be decreased. This enables the production of more sensitive angular rate sensors.

The non-linear relationship between the amplitude of motion of the annular member in the primary mode and the restoring force comprises a relationship with at least a significant non-linear component, wherein the restoring force cannot be effectively expressed as a purely linear function of the amplitude of motion. In some examples the non-linear relationship comprises a significant cubic component, and it may also comprise higher order non-linear terms (e.g. $5^{th}$, $7^{th}$ etc.).

As discussed above, when the amplitude of motion of the annular member in the primary mode is so large as to generate a non-linear restoring force, frequency splitting between the primary and secondary modes would occur in prior angular rate sensors. The amplitude of the induced secondary mode oscillations is typically much smaller than that of the driven primary mode oscillations, although it may be comparable or equal to the amplitude of the primary mode oscillations when the angular rate experienced by the sensor is near a maximum measurable angular rate. It is important that the angular rate sensor is sensitive to a working range of angular rates. In the non-linear regime the shifts in resonant frequency observed in the primary and secondary modes are not the same, resulting in frequency splitting. The secondary mode oscillations, even when not oscillating in the non-linear amplitude regime themselves, are influenced by the non-linear behaviour of the primary mode oscillation through the coupling of the modes and this also contributes to the frequency splitting observed.

In examples of the prior "small" amplitude linear regime, a ring shaped annular member, when driven, oscillates (in both the primary and secondary modes) by deforming alternatingly into two ellipses with their respective major axes oriented perpendicular to one another, in the plane of the resonator. One or more of the supporting structures provide restoring forces which vary linearly with the amplitude of the oscillations. At larger amplitudes, the non-linear behaviour of the annular resonator manifests as a non-linear relationship between the restoring forces and the amplitude of motion of the oscillations and as a result a non-linear shift in the resonant frequency is observed. Annular resonators with a supporting structure layout typically seen in the prior art are not operated in the non-linear regime because the primary and secondary modes have different amplitudes and are subjected to differing amounts of non-linear restoring force which results in resonant frequencies shifting by differing amounts as the amplitudes increase. This leads to the frequency splitting mentioned above, and consequently deterioration in the quality of the measurements made by the angular rate sensor.

The Applicant has appreciated that the number p of supporting structures in the plurality of supporting structures can be selected such that $f_1=f_2$. While the resonant frequencies of the primary and secondary modes still shift with larger amplitudes, they shift by substantially the same amount, such that their frequencies do not split and the measurements made by the angular rate sensor are not affected. The number p of supporting structures in the plurality of supporting structures can be selected such that $f_1=f_2$ throughout operation of the sensor.

Annular resonators have multiple possible modes of oscillation, some of which are "in-plane", wherein displacement or periodic deformations occur in the plane of the annular member. There are also modes of oscillation where the displacement or periodic deformations occur "out of plane", i.e. where the moving annular member has a component extending out of the plane in which the annular member lies at rest.

Preferably the primary mode of oscillation is a cos nθ mode, and the secondary mode of oscillation is a sin nθ mode, where n is the order of the mode, and is equal to any positive integer. Further preferably the primary mode of oscillation is a cos 2θ in-plane mode, although it may comprise a cos 3θ mode and/or a cos 4θ mode. The secondary mode of vibration is preferably a sin 2θ mode, although it may comprise a sin 3θ or sin 4θ mode.

In some sets of examples the number of supporting structures p is chosen such that $$k\frac{n}{p} \neq \text{integer,}$$

where k is an integer between 1 and 6 and n is the order of the primary mode of oscillation, e.g. a cos nθ mode.

Preferably, the resonant frequencies of the primary and secondary modes at low amplitude are substantially identical, e.g. 14 kHz. In some examples the difference between the resonant frequencies of the primary and secondary modes of oscillation is less than 1 Hz, is preferably less than 0.5 Hz and is further preferably less than 0.1 Hz. This may be achieved with the aid of any suitable balancing technique, for example as disclosed by WO 2013/136049, EP 1775551, U.S. Pat. No. 5,739,410 or GB 2460935. The inherent sensitivity (without factoring in this frequency splitting) of an annular resonator can be characterised by its Q factor or linewidth, and preferably the difference between the resonant frequencies is no more than 0.1 of the linewidth.

Preferably, the supporting structures flexibly support the annular member such that it can oscillate freely in any direction. The plurality of supporting structures may be fixed to the substrate in any suitable arrangement. The supporting structures may extend radially inward or outward of the annular member. In one or more examples the plurality of supporting structures are fixed to the substrate at a central support inside the annular member.

In some examples the supporting structures are formed integrally with the substrate. Additionally, or alternatively, the supporting structures are formed integrally with the annular member. The substrate, annular member and supporting structures are preferably made of the same material, and further preferably they are constructed from a single silicon wafer using techniques known in the art e.g., using deep reactive ion etching (DRIE).

In some sets of examples the supporting structures are spaced equiangularly around a circumference (e.g. an inner or outer circumference) of the annular member. The secondary mode of oscillation is offset from the primary mode of oscillation by an angle φ, and it is desirable for the annular resonator to be supported by an integer number of supporting structures within the angular offset φ. This prevents, for example, the positioning of drive and pick-off system electrodes at the antinodes of the primary and secondary modes being hindered by coincidence with a supporting structure. Positioning drive and pick-off electrodes at the antinodes of the primary and secondary modes may increase the sensitivity of the angular rate sensor.

Preferably the number of supporting structures is chosen to be the lowest value of p that satisfies $$k\frac{n}{p} \neq \text{integer}$$

and allows an integer number of supporting structures to be positioned equiangularly within the angular offset φ of the primary and secondary modes. Sensors with large numbers of supporting structures may be more difficult to manufacture, and this might increase the cost of the sensor.

Preferably the supporting structures are substantially identical, at least in terms of shape, mass and stiffness. The supporting structures may be arranged in pairs (e.g. each supporting structure comprising a pair of mirror image legs). In examples where the primary mode of oscillation is a cos 2θ mode, the secondary mode of oscillation is a sin 2θ mode, offset by 45° from the primary mode. In these examples where n=2 it is preferable for the number p of supporting structures to be chosen such that p=16+8×(m−1), where m is a positive integer, e.g. m=1, 2, 3, etc. For example, 16 supporting structures or 24 supporting structures prevent frequency splitting while also ensuring an integer number of supporting structures are positioned within the 45° offset between the primary and secondary modes.

In examples where the primary mode of oscillation is a cos 3θ mode, the secondary mode of oscillation is a sin 3θ mode, offset by 30° from the primary mode. In these examples where n=3 it is preferable for the number p of supporting structures to be chosen such that p=24+12×(m−1), where m is a positive integer. For example, 24 supporting structures or 36 supporting structures may be chosen to ensure an integer number of supporting structures are positioned within the 30° offset between the primary and secondary modes.

In examples where the primary mode of oscillation is a cos 4θ mode, the secondary mode of oscillation is a sin 4θ mode, offset by 22.5° from the primary mode. In these examples where n=4 it is preferable for the number p of supporting structures to be chosen such that p=32+16×(m−1), where m is a positive integer. For example, 32 supporting structures or 48 supporting structures may be chosen to ensure an integer number of supporting structures are positioned within the 22.5° offset between the primary and secondary modes.

As discussed above, the amplitude of motion of the secondary mode of vibration is directly linked to the angular rate experienced by the angular rate sensor. Thus, in one or more examples, the pick-off system is arranged to calculate the angular rate experienced by the angular rate sensor using the determined amplitude of motion of the secondary mode of vibration. The calculation of angular rate using the determined amplitude of the secondary mode of oscillation is a standard technique known by those skilled in the art.

The amplitude of the secondary mode vibrations may be determined by directly measuring the amplitude of the secondary mode vibrations (known by those skilled in the art as an "open loop" system). In some examples the pick-off system is arranged to calculate the angular rate experienced by the angular rate sensor by directly measuring the amplitude of motion of the secondary mode of vibration in open loop. Alternatively the amplitude of the induced secondary mode vibrations are determined by applying a feedback force to the annular resonator and measuring the magnitude of feedback force required to nullify the secondary mode vibrations (a "closed loop" system). It is usual to provide a secondary drive which nulls the secondary motion (closed loop operation) at the same frequency as the primary drive. The secondary drive is then a measure of rotation rate. In some examples the pick-off system is arranged to calculate the angular rate experienced by the angular rate sensor by applying a feedback force to the annular member and measuring the feedback force required to nullify the amplitude of motion of the secondary mode of vibration in closed loop.

The driving force may be applied to the annular member in any suitable way. In some examples, the angular rate sensor is a capacitive type sensor, which those skilled in the art understand to mean the driving force is provided by capacitive drive elements, although the driving force could additionally or alternatively be provided by inductive means, piezoelectric means or any other technology suitable for providing the driving force known in the art per se.

In examples comprising a closed-loop type sensor, the feedback force may be provided by secondary driving means utilising any of the techniques discussed above. In examples comprising an open loop type sensor, the amplitude of the secondary mode oscillations may be sensed by inductive, capacitive and/or piezoelectric means, and/or by any other suitable means, e.g. optical.

Preferably, the annular member comprises a ring, although it may comprise any generally annular shape, for example an octagon. For a cos 2θ primary mode of vibration, for example, the structure has to have at least 8θ symmetry to ensure that the primary and secondary modes remain degenerate.

The present disclosure is also applicable to rate integrating gyroscopes.

The present disclosure extends to a method of making a vibrating structure angular rate sensor, the angular rate sensor comprising a substrate, a plurality of supporting structures fixed to the substrate and an annular member flexibly supported by the plurality of supporting structures to move elastically relative to the substrate. The method includes: designing the sensor to be operated by: applying a periodic driving force to the annular member such that the annular member oscillates, in use, in a primary mode of vibration at a resonant frequency $f_1$ with an amplitude of motion that generates a restoring force from the plurality of supporting structures; and determining the amplitude of motion of a secondary mode of vibration at a resonant frequency $f_2$, in which oscillation of the annular member is induced by the Coriolis force resulting from an angular rate experienced by the angular rate sensor. The restoring force has a non-linear relationship with the amplitude of motion in use. The method also includes selecting a number p of supporting structures in the plurality of supporting structures such that $f_1=f_2$ in use.

Features of any example described herein may, wherever appropriate, be applied to the disclosed method of making and designing a vibrating structure angular rate sensor. Where reference is made to different examples or sets of examples, it should be understood that these are not necessarily distinct but may overlap.

The present disclosure further extends to a vibrating structure angular rate sensor made according to the disclosed method.

BRIEF DESCRIPTION OF THE DRAWINGS

One or more non-limiting examples will now be described, by way of example only, and with reference to the accompanying figures, in which:

FIG. 5 is a graphical representation of the relationship between the restoring force and amplitude of motion for an annular resonator;

DETAILED DESCRIPTION

Figure 1B:
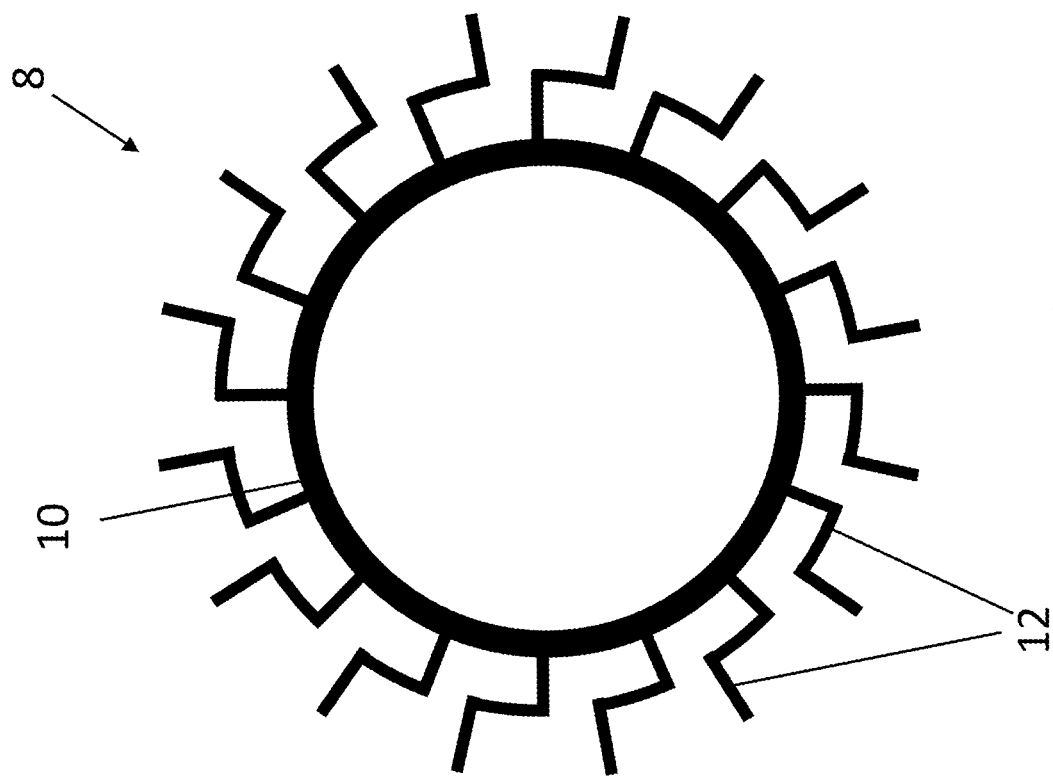
FIG. 1b illustrates an annular resonator according to the present disclosure
Figure 1A:
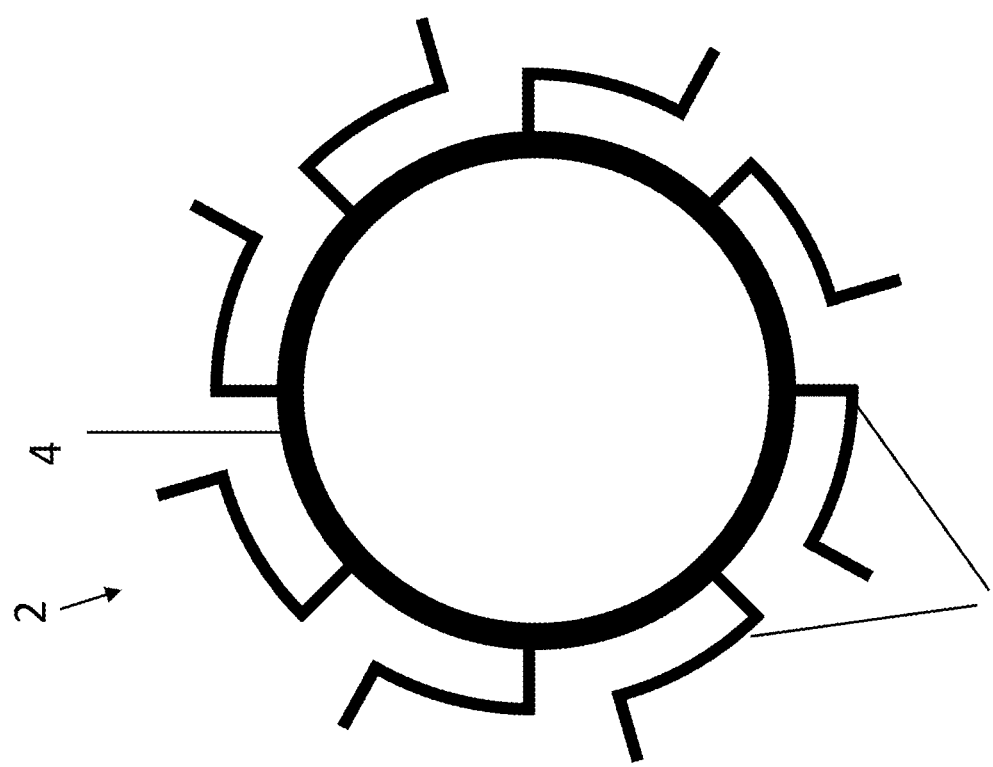
FIG. 1a illustrates a typical annular resonator found in the prior art

FIG. 1a shows an annular resonator 2 that comprises an annular member 4 connected to eight supporting structures 6, as found in a typical vibrating structure angular rate sensor. The supporting structures 6 are spaced equiangularly around the exterior of the annular member 4. The supporting structures 6 extend radially outwards (as shown) or inwards from the annular member 4 to connect to a fixed structure (not shown), and are Z-shaped to provide radial and tangential compliance. Typically the annular resonator 2 is a MEMS device formed from a semiconductor e.g. Si substrate. The fixed structure may therefore be the Si substrate in which the supporting structures 6 and annular member 4 are formed, e.g. by DRIE. The supporting structures 6 have a degree of flexibility, or compliance, that enables the annular member 4 to move elastically relative to the substrate (not shown), e.g. when deforming in response to an applied force.

Figure 7:
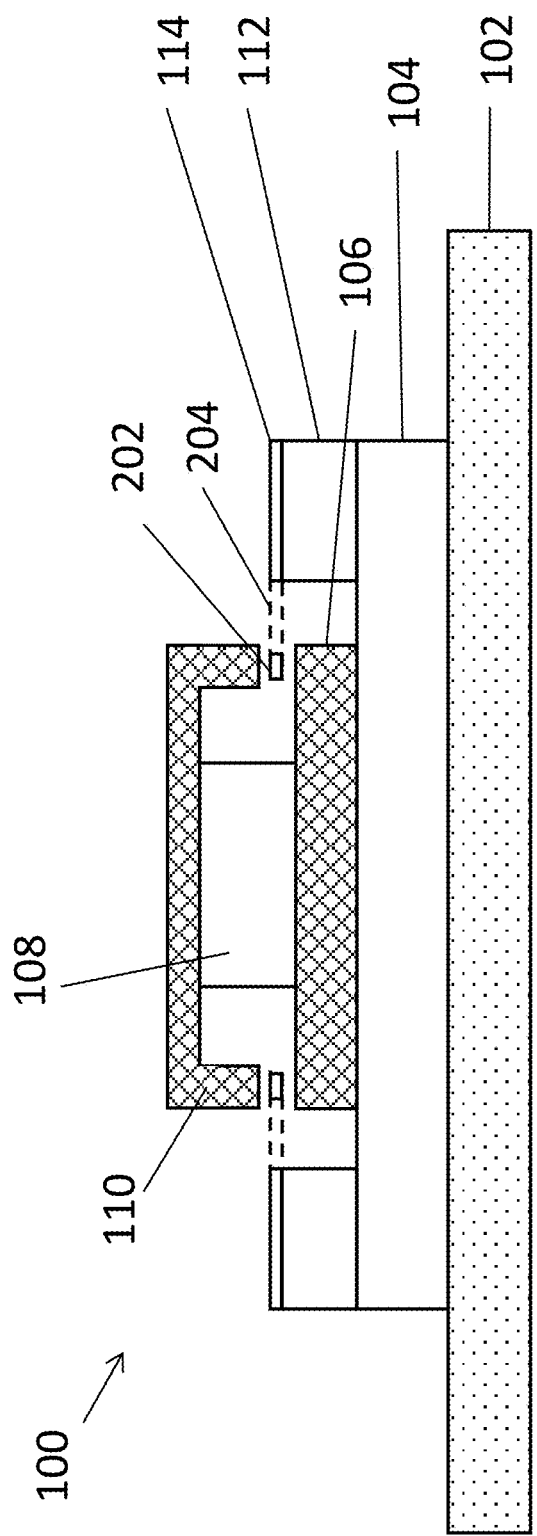
FIG. 7 is a schematic cross-sectional view of an inductive type vibrating structure angular rate sensor.

FIG. 7 is a schematic cross-sectional view of an inductive type vibrating structure angular rate sensor 100 according to one example. A substrate comprises a base 102, on which sits a stack of components including a support glass layer 104, a lower pole 106, a magnet 108 and an upper pole 110. A pedestal 112 sits upon the support glass layer 104, peripheral to the lower pole 106, and supports a silicon die 114. A planar annular member (or "ring") 202 is flexibly supported by a plurality of supporting structures (or "legs") 204 fixed at one end to the silicon die 114. The ring 202 is arranged so that it lies between the upper pole 110 and lower pole 106 and the inductive drive system applies a periodic driving force during use. When the magnet 108 creates a vertical magnetic field in the region of the ring 202, and an oscillating current is applied tangentially along metal tracks carried by the ring 202, the ring 202 is caused to oscillate radially in the primary Cos 2θ mode. WO 2010/007406, the contents of which are hereby incorporated by reference, provides further details about how metal tracks are typically provided over an insulating surface oxide layer on an upper surface of the ring 202 and along its supporting legs 204, each metal track associated with a single drive or pick-off transducer. While FIG. 7 illustrates an inductive-type vibrating structure angular rate sensor, a capacitive version is possible wherein there is no magnet assembly and instead there are provided radial capacitive electrodes for the drive system. An example of such a capacitive-type vibrating structure angular rate sensor is described in U.S. Pat. No. 6,282,958, the contents of which are hereby incorporated by reference. The pick-off system may comprise capacitive electrodes arranged to determine the amplitude of motion of the secondary mode of vibration.

In this example of an inductive-type sensor, the supporting structures 204 extend radially outwardly from the annular member 202 to the silicon die 114 of the substrate so as to accommodate the magnet 108. However, it will be appreciated that, in other examples, one or more of the supporting structures 204 may instead, or additionally, extend radially inwardly to a fixed support located interior to the annular member 202, e.g. a central support inside the annular member 202, for example in a capacitive type sensor.

Figure 2B:
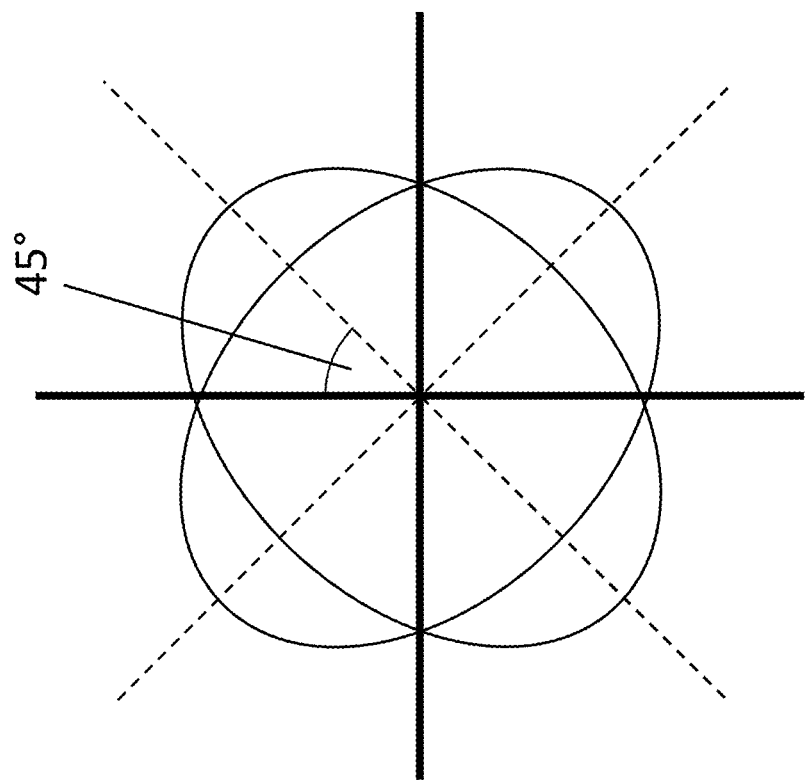
FIGS. 2a and 2b show diagrammatically primary (2a) Cos 2θ and secondary (2b) Sin 2θ vibration modes in an annular resonator.
Figure 2A:
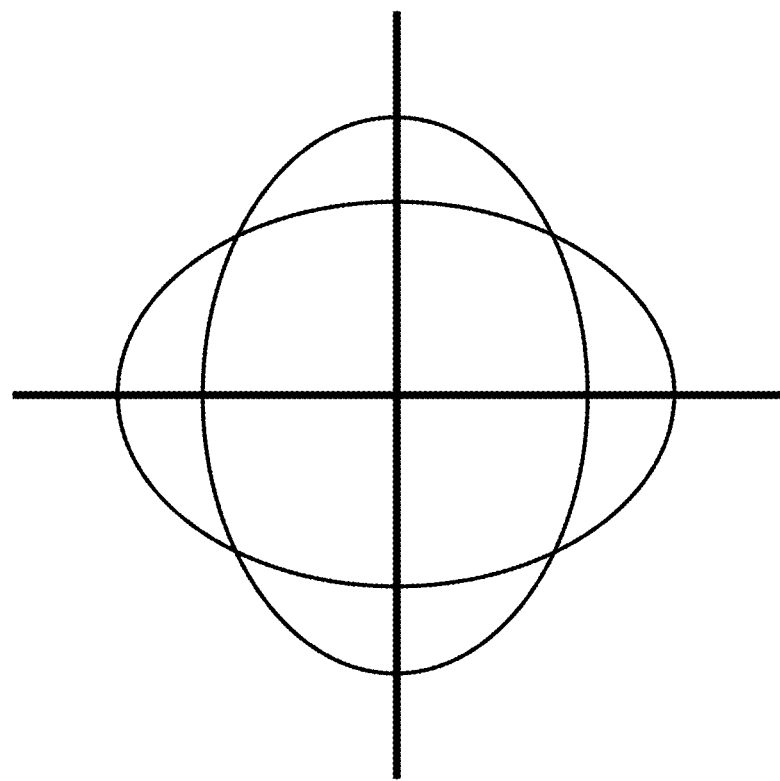

In a typical prior art use, the annular resonator 2 in FIG. 1a forms part of an angular rate sensor that is driven using a drive system (not shown) which cause the annular member 4 to oscillate in an in-plane primary cos 2θ mode, depicted diagrammatically in FIG. 2a. The drive means periodically applies radial forces to sections of the annular member 4 in order to drive the cos 2θ oscillations. When the annular resonator 2 experiences a rotation about an axis perpendicular to the plane in which the annular member 4 lies, the Coriolis effect induces oscillation in a secondary sin 2θ mode, which is 45° offset from the primary mode of oscillation, and is depicted diagrammatically in FIG. 2b. The amplitude of the secondary mode oscillations is dependent upon both the amplitude of the primary mode oscillations and the rate of rotation.

In open loop operation, the amplitude of the induced secondary mode oscillation is sensed by sensing means (not shown), and the angular rate experienced by the annular resonator 2 is calculated from the sensed secondary amplitude. In closed loop operation, a secondary drive applies forces to null the oscillation in the secondary mode and this is used to calculate the angular rate.

Figure 6B:
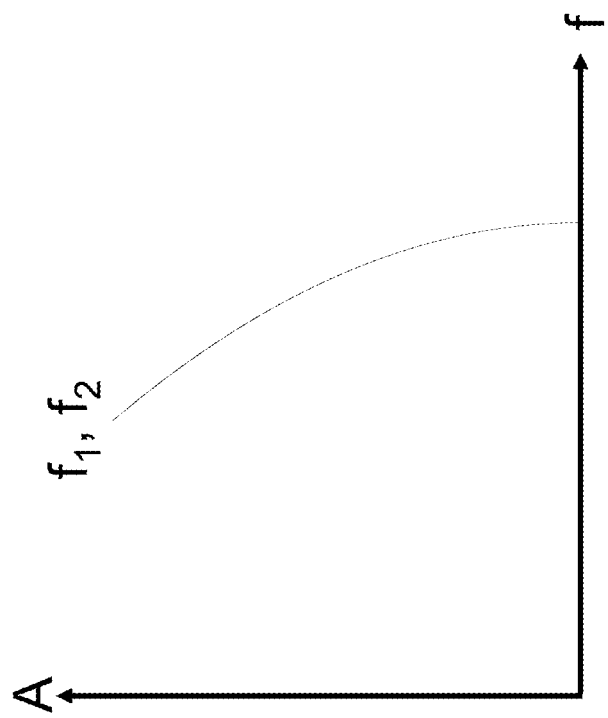
FIG. 6b is a graphical representation of the amplitude—resonant frequency relationship for an annular resonator according to the present disclosure.
Figure 6A:
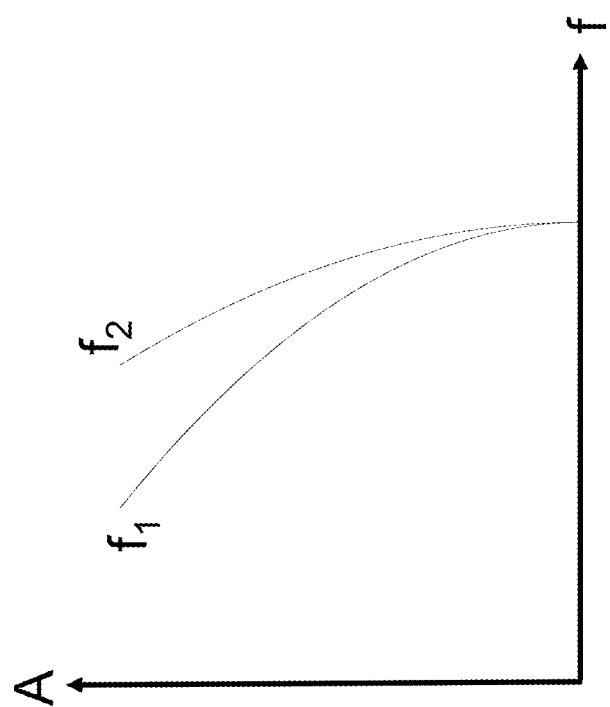
FIG. 6a is a graphical representation of the amplitude—resonant frequency relationship for a typical annular resonator found in the prior art.

In such a prior art use, the annular resonator 2 is driven such that the amplitude A of the oscillations in the primary mode generate a generally linear restoring force. This is termed the linear amplitude regime, and is shown as a low amplitude region 50 on the graph in FIG. 5. The annular resonator 2 cannot be driven at higher amplitudes, as this leads to splitting of the resonant frequencies of the primary and secondary modes $f_1$, $f_2$, as depicted in FIG. 6a, which shows the resonant frequencies of the primary and secondary modes $f_1$, $f_2$ for different amplitudes A of the primary mode. Splitting of the resonant frequencies introduces noise into the angular rate measurements and high amplitude operation is therefore avoided in prior art sensors.

FIG. 1b shows an annular resonator 8 that comprises an annular member 10 connected to sixteen supporting structures 12, according to the present disclosure. The supporting structures 12 are spaced equiangularly around the annular member 10. The supporting structures 12 extend radially outwards (as shown) or inwards from the annular member 10 to connect to a fixed structure (not shown). Typically the annular resonator 8 is a MEMS device formed from a semiconductor e.g. Si substrate. The fixed structure may therefore be the Si substrate in which the supporting structures 12 and annular member 10 are formed, e.g. by DRIE. The supporting structures 12 have a degree of flexibility, or compliance, which enables the annular member 10 to move elastically relative to the substrate e.g. deforming when it experiences an applied force. To ensure radial and tangential compliance, the supporting structures 12 are Z-shaped, although many design variations are possible which achieve these compliance requirements. Z-shaped supporting structures are described in GB 2322196, the contents of which are hereby incorporated by reference in their entirety.

Figure 8:
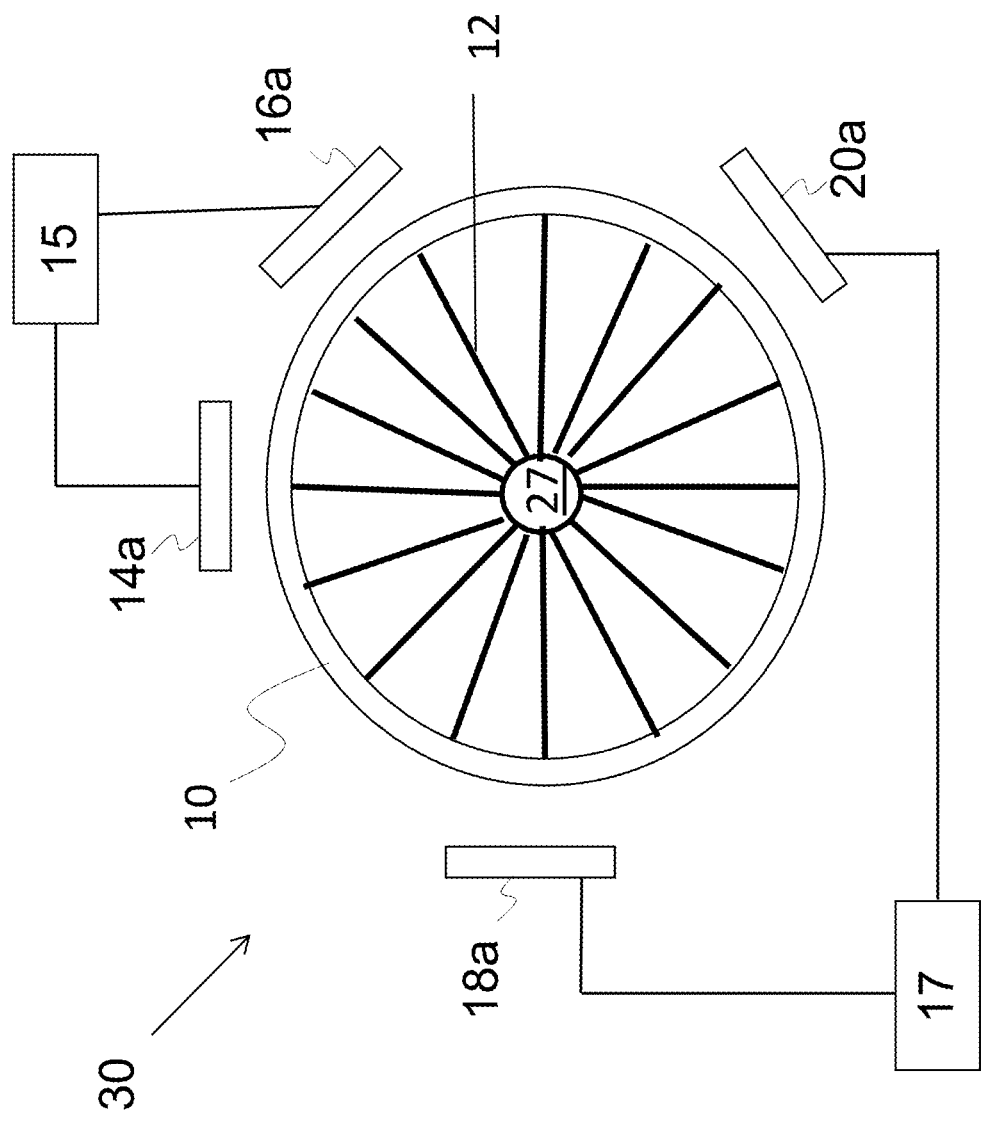
FIG. 8 is a schematic overview diagram for a vibrating structure angular rate sensor.

FIG. 8 shows a schematic diagram of a vibrating structure angular rate sensor 30 in accordance with an example of such an annular resonator 8. The sensor 30 comprises a micro-machined mass in the form of a silicon planar ring member 10 having sixteen radially compliant legs 12 fixed to a central hub 27 provided by a silicon substrate. Spaced around the ring member 10 is a primary drive actuator 14a and a secondary drive actuator 16a connected to a drive system 15, and a primary pick-off transducer 18a and a secondary pickoff transducer 20a connected to a pick-off system 17. The primary pick-off transducer 18a is aligned perpendicularly to, and in the same plane as, the primary drive actuator 14a. The secondary pick-off transducer 20a is aligned perpendicularly to, and in the same plane as, the secondary drive actuator 16a.

When the annular resonator 8 undergoes a rotation about an axis perpendicular to the plane in which the annular member 10 lies, the Coriolis effect induces an oscillation in the secondary sin 2θ mode, and the amplitude of this induced oscillation is measured using the pick-off system 17 operating in either open or closed-loop as discussed above (not shown) to determine the angular rate experienced by the annular resonator 8, in the same manner as described for the prior art resonator 2.

In contrast to the prior art annular resonator 2, however, the number and arrangement of the supporting structures 12 ensure that the resonant frequencies $f_1$, $f_2$ of the primary and secondary mode oscillations do not split at large amplitudes, and the annular resonator 8 can therefore be driven such that the amplitude of the primary cos 2θ mode oscillations generates a non-linear restoring force. This non-linear regime is shown as a high amplitude region 52 in FIG. 5. FIG. 6b illustrates the lack of splitting in the primary and secondary modes at high amplitudes for the annular resonator 8, i.e. the primary and secondary resonant frequencies $f_1$, $f_2$ remain equal across a large range of amplitudes A.

Driving the annular resonator 8 to produce larger amplitude primary mode oscillations results in larger amplitude induced secondary mode oscillations for a given angular rate, and therefore reduced uncertainty and noise in the calculated angular rate when using sensing means with the same precision.

The annular resonator 8 has so far been described as an example of an annular resonator arranged to resonate in the primary cos 2θ and secondary sin 2θ modes, which are illustrated in FIGS. 2a and 2b. However higher order modes of resonance are possible for examples of annular resonators with a different number and/or configuration of supporting structures and indeed this may be beneficial in some circumstances.

Figure 3B:
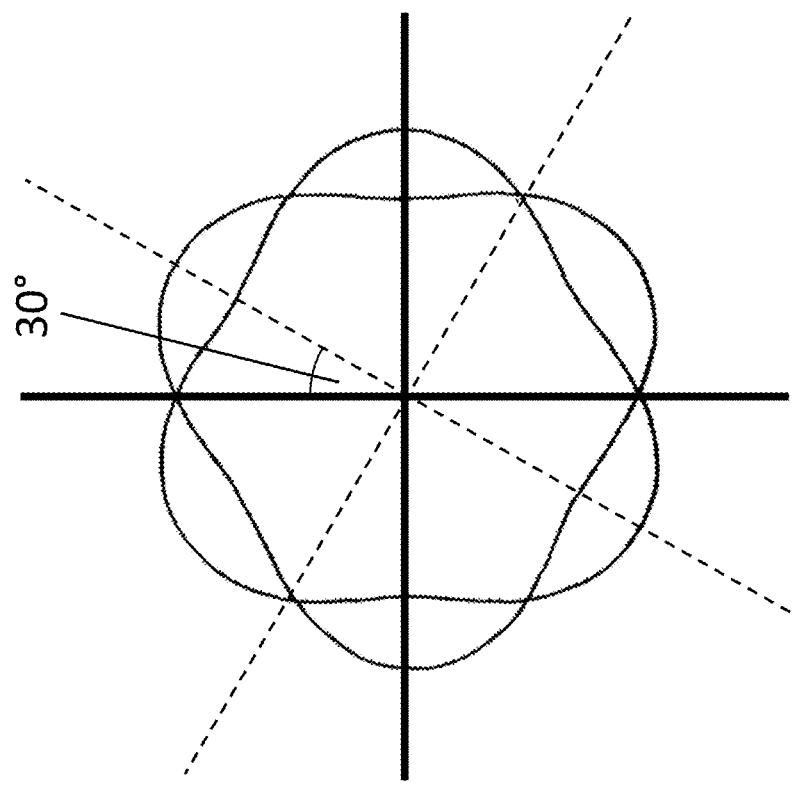
FIGS. 3a and 3b show diagrammatically primary (3a) Cos 3θ and secondary (3b) Sin 3θ in-plane vibration modes in an annular resonator.
Figure 3A:
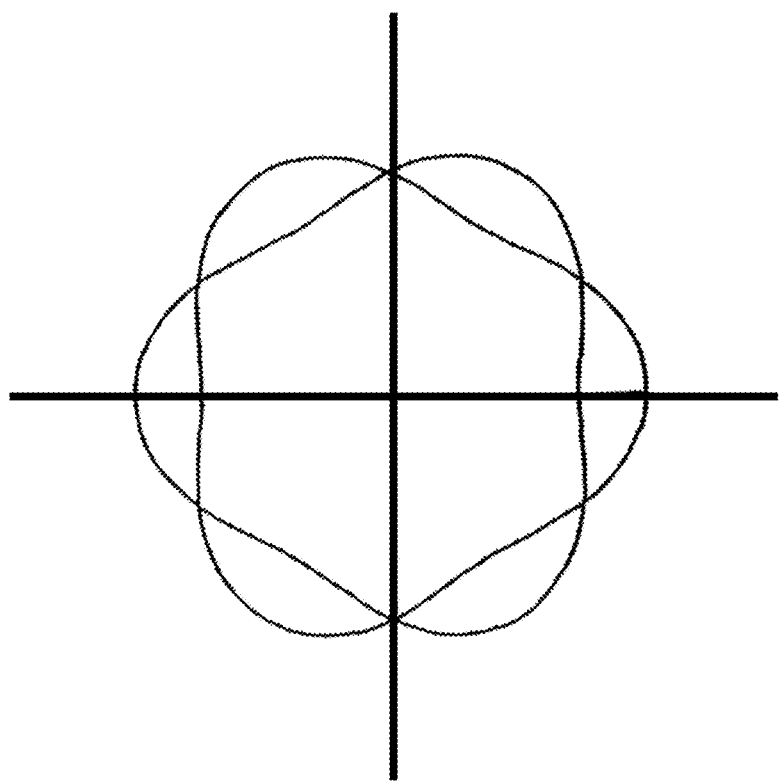

FIGS. 3a and 3b diagrammatically show the primary cos 3θ and secondary sin 3θ modes respectively, wherein the secondary mode oscillations are offset from the primary mode oscillations by 30°.

Figure 4B:
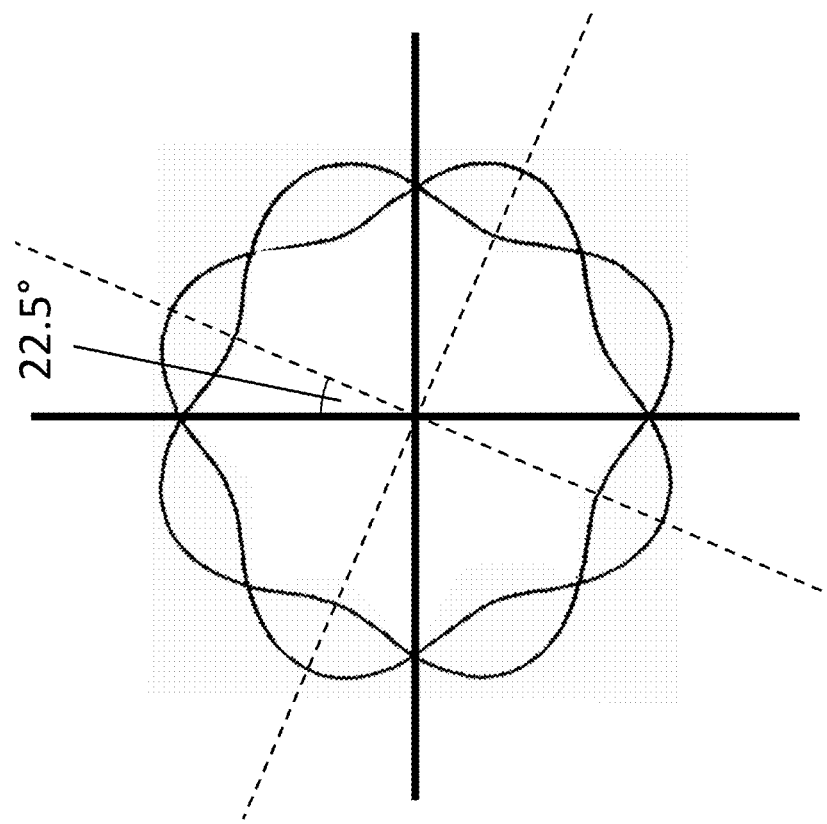
FIGS. 4a and 4b show diagrammatically primary (4a) Cos 4θ and secondary (4b) Sin 4θ in-plane vibration modes in an annular resonator.
Figure 4A:
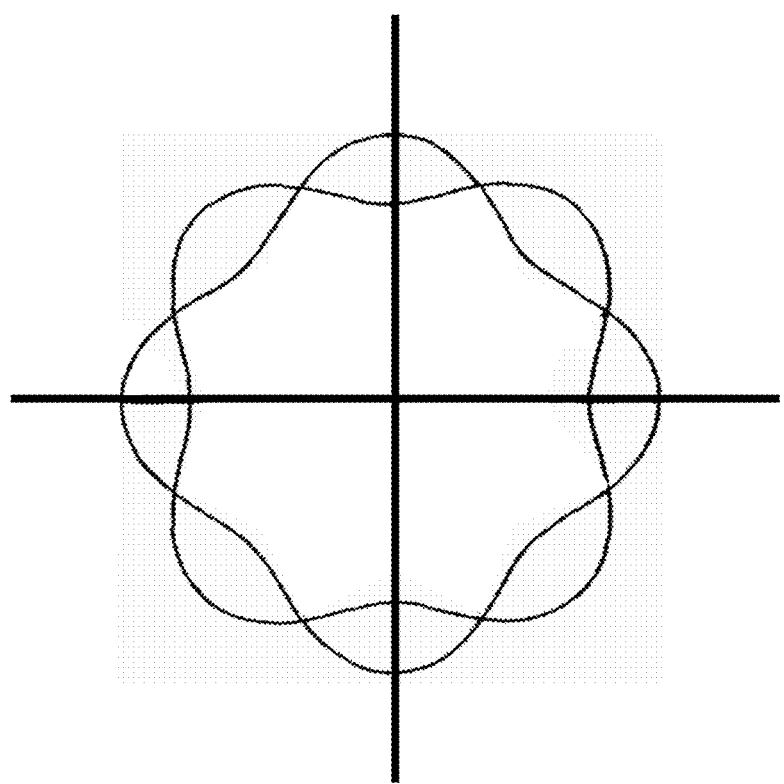

FIGS. 4a and 4b diagrammatically show the primary cos 4θ and secondary sin 4θ modes respectively, wherein the secondary mode oscillations are offset from the primary mode oscillations by 22.5°.

FIG. 5 is a schematic representation of the relationship between the amplitude of motion A for a ring resonator and the restoring force F generated by the supporting structures 12, for a given mode of vibration, e.g. the primary mode of vibration.

It can be seen that the restoring force F has a linear relationship in the "low" amplitude range 50, or is well-approximated by a linear relationship. In contrast, the restoring force F has an increasingly non-linear relationship in the "high" amplitude range 52. In the prior art, the amplitude of motion is chosen to be within this "low" range 50 so that support non-linearities do not need to be taken into account when measuring angular rate (in open or closed loop).

However the inventors have recognised that it may be desirable to drive the primary mode of vibration in the "high" amplitude range 52 so as to increase the amplitude of motion in the secondary mode, to reduce measurement noise and improve sensitivity when measuring angular rate. As can be seen in FIG. 5, as the amplitude A of vibration increases, the effect of geometrical non-linearity becomes more pronounced and the restoring force F has a non-linear relationship with amplitude of motion, including e.g. cubic factors. This means that the restoring force F is following a non-linear relationship when the amplitude A of motion in the primary mode is "high" and the amplitude of motion in the secondary mode, which is always much smaller, is "low". This results in frequency splitting.

FIG. 6a is a schematic representation showing how the resonant frequency $f_1$ for the primary mode and frequency $f_2$ for the secondary mode are affected by an increase in the amplitude of motion according to the prior art. In the "low" amplitude range the two frequencies are about the same. In the "high" amplitude range there is an increasing frequency split between the two modes.

For the example of a typical vibrating ring gyroscope, having a ring diameter of 6 mm and 8 support legs spaced around the ring, operating at a resonant frequency of 14 kHz for the primary cos 2θ mode, such a frequency split is generally seen for amplitudes of motion of 20 μm. The difference in frequency between the primary and secondary modes is of the order of 1-2 Hz.

FIG. 6b is a schematic representation showing how the resonant frequency $f_1$ for the primary mode and frequency $f_2$ for the secondary mode are no longer split using the present disclosure to select the number of support legs for the ring. For the example of a ring diameter of 6 mm and 16 support legs spaced around the ring, operating at a resonant frequency of 14 kHz for the primary cos 2θ mode, there is no longer a frequency split for amplitudes of motion of 20 μm.

More generally, it is disclosed herein that the number p of supporting structures is chosen such that $$k\frac{n}{p} \neq \text{integer},$$

where k is an integer between 1 and 6 and n is the order of the primary mode of oscillation, e.g. a cos nθ mode. In the example given above, the gyroscope has a ring driven to oscillate in the primary cos 2θ mode (i.e. n=2) and the number of support legs p is chosen to be one of the lowest values of p that satisfies the aforementioned rule, i.e. p=16. Sensors with larger numbers of supporting structures may be more difficult to manufacture, and this might increase the cost of the sensor. However it can be seen from Table 1 below that a vibrating structure gyroscope or angular rate sensor driven in the cos 2θ mode could comprise p=16, 24, 32, etc. for the number of support legs in order to avoid frequency splitting when driven to oscillate with large amplitude.

The skilled person will of course take into account any practical design constraints for p when selecting the number of supporting structures for a given annular resonator in practice. Although p=7 results in $f_1=f_2$ for a ring oscillating in the primary cos 2θ mode, it is convenient from a design perspective to have an integer number of support legs every 45 degrees and secondary cos 2θ modes are oriented 45 degrees apart. For n=2, it can be shown that the number p of supporting structures not yielding frequency splits and maintaining this practical symmetry is given by the formula:

16+8×(m−1), where m=1,2,3,4, etc. (i.e. a positive integer).

In other words, practical designs for an angular rate sensor comprising an annular member driven at high amplitude in the primary cos 2θ mode, not yielding frequency splits ($f_1=f_2$) occur for p=16, 24, 32, 40, 48, etc. . . . identical, uniformly spaced support legs.

In general, the number p of support legs for higher order modes of vibration, i.e. n=3, 4 may be selected according to Table 1 below.

TABLE 1

|  |  | p supports | | | | | | | | | |
|---|---|---|---|---|---|---|---|---|---|---|---|
|  | P | 2 | 3 | 4 | 5 | 6 | 7 | 8 | 16 | 24 | 32 | 36 |
| Mode number n | n = 2 | Split | Split | Split | Split | Split | Equal | Split | Equal | Equal | Equal | Equal |
|  | n = 3 | Split | Split | Split | Split | Split | Equal | Equal | Equal | Equal | Equal | Equal |
|  | n = 4 | Split | Split | Split | Split | Split | Equal | Split | Split | Split | Equal | Equal |

When calculating the number of supporting structures, p, to avoid frequency splitting in the non-linear "high" amplitude range, the frequencies have been considered for a pair of nθ modes of a perfect uniform ring with p identical, uniformly spaced supporting structures having the same mass and (radial and tangential) stiffness properties.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A vibrating structure angular rate sensor comprising:
a substrate, a plurality of supporting structures fixed to the substrate and an annular member flexibly supported by the plurality of supporting structures to move elastically relative to the substrate;
a drive system arranged to apply a periodic driving force to the annular member such that the annular member oscillates, in use, in a primary mode of vibration at a resonant frequency $f_1$ with an amplitude of motion that generates a restoring force from the plurality of supporting structures; and
a pick-off system arranged to determine the amplitude of motion of a secondary mode of vibration at a resonant frequency $f_2$, in which oscillation of the annular member is induced by the Coriolis force resulting from an angular rate experienced by the angular rate sensor;
wherein, in use, the restoring force has a non-linear relationship with the amplitude of motion such that the resonant frequency $f_1$ and the resonant frequency $f_2$ shift by different amounts, and a number p of supporting structures in the plurality of supporting structures is selected such that $f_1=f_2$.

2. The sensor of claim 1, wherein the primary mode of vibration is a cos nθ mode, and the number p of supporting structures is chosen such that $$k\frac{n}{p} \neq \text{integer},$$

where k is an integer between 1 and 6.

3. The sensor of claim 1, wherein the number p of supporting structures is chosen to be the lowest value of p that satisfies $$k\frac{n}{p} \neq \text{integer}$$

and allows an integer number of supporting structures to be positioned equiangularly within an angular offset φ between the primary and secondary modes of vibration, where k is an integer between 1 and 6.

4. The sensor of claim 1, wherein the primary mode of oscillation is an in-plane cos 2θ mode, and the number p of supporting structures is chosen such that p=16+8×(m−1), where m is a positive integer.

5. The sensor of claim 1, wherein the supporting structures are spaced equiangularly around a circumference of the annular member.

6. The sensor claim 1, wherein the angular rate sensor is a capacitive type, inductive type or piezoelectric type sensor.

7. The sensor of claim 1, wherein the plurality of supporting structures are fixed to the substrate at a central support inside the annular member.

8. The sensor of claim 1, wherein the pick-off system is arranged to calculate the angular rate experienced by the angular rate sensor using the determined amplitude of motion of the secondary mode of vibration.

9. The sensor of claim 1, wherein the non-linear relationship between the restoring force and the amplitude of motion of the primary mode of vibration has a significant cubic component.

10. A method of making a vibrating structure angular rate sensor, the angular rate sensor comprising a substrate, a plurality of supporting structures fixed to the substrate and an annular member flexibly supported by the plurality of supporting structures to move elastically relative to the substrate, the method comprising:
designing the sensor to be operated by:
applying a periodic driving force to the annular member such that the annular member oscillates, in use, in a primary mode of vibration at a resonant frequency $f_1$ with an amplitude of motion that generates a restoring force from the plurality of supporting structures; and
determining the amplitude of motion of a secondary mode of vibration at a resonant frequency $f_2$, in which oscillation of the annular member is induced by the Coriolis force resulting from an angular rate experienced by the angular rate sensor;

wherein the restoring force has a non-linear relationship with the amplitude of motion in use such that the resonant frequency $f_1$ and the resonant frequency $f_2$ shift by different amounts; and selecting a number p of supporting structures in the plurality of supporting structures such that $f_1=f_2$ in use.

11. The method of claim 10, wherein the primary mode of vibration is a cos nθ mode and wherein selecting the number p of supporting structures is based on $$k\frac{n}{p} \neq \text{integer},$$

where k is an integer between 1 and 6.

12. The method of claim 10, wherein selecting the number p of supporting structures is based on the lowest value of p that satisfies $$k\frac{n}{p} \neq \text{integer}$$

and allows an integer number of supporting structures to be positioned equiangularly within an angular offset φ between the primary and secondary modes of vibration, where k is an integer between 1 and 6.

13. The method of claim 10, wherein the primary mode of oscillation is an in-plane cos 2θ mode, and wherein selecting the number p of supporting structures is based on p=16+8×(m−1), where m is a positive integer.

14. The method of claim 10, wherein the non-linear relationship between the restoring force and the amplitude of motion of the primary mode of vibration has a significant cubic component.

* * * * *